(12) United States Patent
Ku (10) Patent No.: US 9,669,863 B2
(45) Date of Patent: Jun. 6, 2017

(54) STEERING COLUMN FOR VEHICLE

(71) Applicant: MANDO CORPORATION, Pyeongtaek-si, Gyeonggi-do (KR)

(72) Inventor: Sang Chul Ku, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/053,940

(22) Filed: Feb. 25, 2016

(65) Prior Publication Data

US 2016/0257333 A1    Sep. 8, 2016

(30) Foreign Application Priority Data

Mar. 2, 2015    (KR) .................. 10-2015-0028772

(51) Int. Cl.
  *B62D 1/16*    (2006.01)
  *B62D 1/19*    (2006.01)
  *B62D 1/181*    (2006.01)

(52) U.S. Cl.
  CPC ............. *B62D 1/195* (2013.01); *B62D 1/181* (2013.01)

(58) Field of Classification Search
  USPC .................................. 74/492, 493
  See application file for complete search history.

(56) References Cited

U.S. PATENT DOCUMENTS

| 5,115,691 A | * | 5/1992 | Beauch | B62D 1/192 280/777 |
|---|---|---|---|---|
| 6,623,036 B2 | * | 9/2003 | Yamamura | B62D 1/184 280/775 |
| 8,408,089 B2 | * | 4/2013 | Oshita | B62D 1/192 280/775 |
| 8,640,567 B2 | * | 2/2014 | Matsuno | B62D 1/181 280/775 |
| 8,678,435 B2 | * | 3/2014 | Sakata | B62D 1/184 280/775 |
| 8,967,017 B2 | * | 3/2015 | Osawa | B62D 1/184 280/775 |
| 2005/0104353 A1 | * | 5/2005 | Ikeda | B62D 1/187 280/775 |
| 2009/0100956 A1 | * | 4/2009 | Warashina | B62D 1/181 74/493 |
| 2009/0205458 A1 | * | 8/2009 | Clark | B62D 1/16 74/493 |

(Continued)

*Primary Examiner* — Toan To
(74) *Attorney, Agent, or Firm* — McDermott Will & Emery LLP (57) ABSTRACT

The present invention relates to a steering column for a vehicle. An exemplary embodiment of the present invention provides a steering column for a vehicle, including: an upper tube coupled to the exterior of a steering shaft and having a first long hole axially formed in one side surface thereof; a lower housing coupled to the outer circumferential surface of the upper tube and having a second long hole axially formed in one side surface thereof that corresponds to the first hole; a first support member supported on the inner circumferential surface of the upper tube; and a second support member, one side of which is coupled to a telescope drive unit and the opposite side of which is located on the outside of the lower housing and is coupled to the first support member through a fastening member passing through the first and second holes.

12 Claims, 6 Drawing Sheets

(56) References Cited

U.S. PATENT DOCUMENTS

| | | | | |
|---|---|---|---|---|
| 2010/0139439 A1* | 6/2010 | Uesaka | ............... | B62D 1/184 74/493 |
| 2012/0234127 A1* | 9/2012 | Okano | ............... | B62D 1/184 74/493 |
| 2012/0266716 A1* | 10/2012 | Sulser | ............... | B62D 1/184 74/493 |

* cited by examiner

STEERING COLUMN FOR VEHICLE

CROSS-REFERENCE TO RELATED APPLICATION

This application claims priority from and the benefit under 35 U.S.C. §119(a) of Korean Patent Application No. 10-2015-0028772, filed on Mar. 2, 2015, which is hereby incorporated by reference for all purposes as if fully set forth herein.

BACKGROUND OF THE INVENTION

1. Field of the invention

The present invention relates to a steering column for a vehicle. More specifically, the present invention relates to a steering column for a vehicle that can: easily adjust the collapse load of the steering column in case of a collision of the vehicle; improve collision performance by adjusting the collapse load in conformity with the collision property according to the type of vehicle; and reduce the number of components, the assembly process, and the assembly cost.

2. Description of the Prior Art

Steering columns for vehicles generally include a telescopic function and a tilt function, and drivers can adjust the degree to which the steering wheels protrude and the angles by which the steering wheels are tilted in conformity with their heights or body types to effectively perform steering operations.

Figure 1:
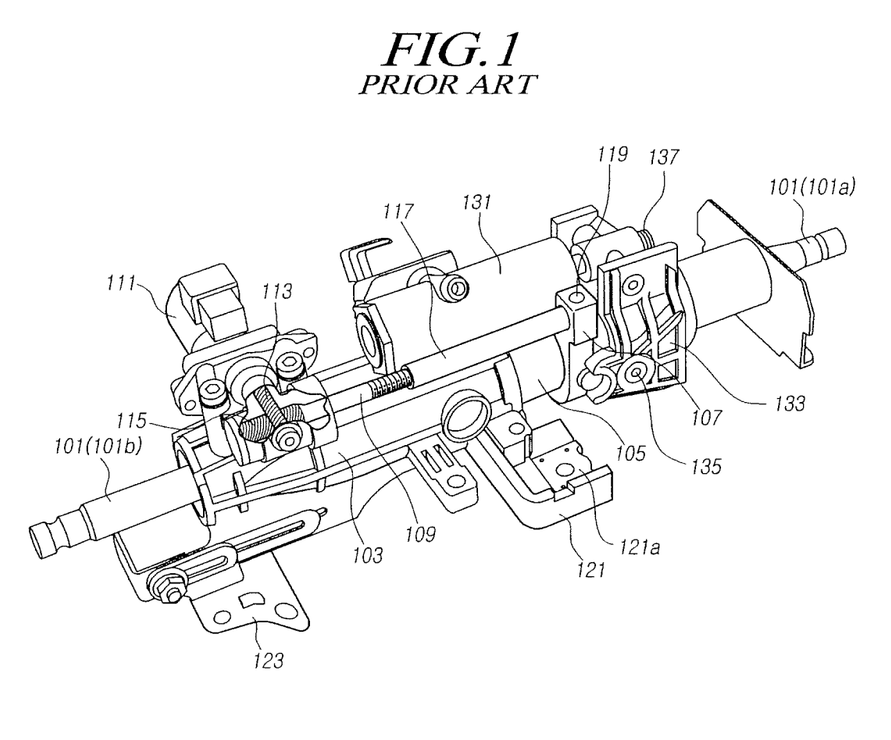
FIG. 1 is a perspective view of a steering column for a vehicle according to the related art.

FIG. 1 is a perspective view of a steering column for a vehicle according to the related art.

As illustrated in FIG. 1, the steering column for a vehicle, according to the related art, includes: a steering shaft 101 connected to the steering wheel (not illustrated) of the vehicle; a column housing 103 that surrounds the steering shaft 101; a sliding housing 105 inserted into the column housing 103 to slide in the axial direction; a nut fixing part 107 formed on the rear end of the sliding housing 105; a telescope nut 117 that is coupled to the outer peripheral portion of the nut fixing part 107 and has a female screw formed on the inner circumferential surface thereof; a telescope motor 111 provided on a side of the column housing 103; a worm shaft 113 driven by the telescope motor 111; a telescope screw 109 that has a worm wheel 115 formed on the front end thereof and engaged with the worm shaft 113 and a male screw formed on the rear end thereof and inserted into the telescope nut 117; and a tilt housing 133 tilted about a hinge shaft 135 by a tilt motor 131 and a tilt screw 137.

The steering shaft 101 is connected at the upper end thereof to the steering wheel (not illustrated) and rotates according to a driver's operation of the steering wheel (not illustrated) to transmit a steering force to both wheels (not illustrated) through a rack and pinion mechanism (not illustrated) at the lower end thereof.

The steering wheel 101 has a structure in which upper and lower steering shafts 101a and 101b are configured to slide relative to each other so that a telescopic operation is possible.

The column housing 103 is formed to surround the steering shaft 101 and is secured to the body of a vehicle through upper and lower brackets 121 and 123 formed on the upper and lower sides thereof, respectively, to support the steering shaft 101.

The sliding housing 105 surrounds the steering shaft 101 and is inserted into the upper end of the column housing 103 so as to slide relative to the column housing 103. The sliding housing 105 has a cylindrical shape and is coupled, at the rear end thereof, to the nut fixing part 107.

The telescope nut 117 moves forward or backward in the axial direction according to the rotation of the telescope screw 109 to make the telescopic operation possible. The telescope nut 117 is press-fit into the outer peripheral portion of the nut fixing part 107 and extends in the axial direction of the column housing 103.

Meanwhile, the nut fixing part 107 includes a coupling pin 110 that simultaneously passes through the telescope nut 117 and the nut fixing part 107.

Since the coupling pin 119 is not completely secured to the telescope nut 117 or the nut fixing part 107 even though the coupling pin passes through the telescope nut 117 and the nut fixing part 107, the telescope nut 117 may rotate about the coupling pin 119 at a predetermined angle and may also move upward and downward by a predetermined distance along the coupling pin 119.

The worm shaft 113 is rotated by a driving force received from the telescope motor 111 to drive the telescope screw 109.

The telescope screw 109 is driven by the telescope motor 111 and the worm shaft 113 to allow the telescope nut 117 and the nut fixing part 107 to move forward and backward.

When the driver operates a telescope switch (not illustrated), the motor is driven, and the driving force of the motor is transmitted to the telescope screw 109 through the worm shaft 113 and the worm wheel 115 to rotate the telescope screw 109 so that the sliding housing 105 to which the telescope nut 117 is coupled slides in the direction of the steering shaft, thereby performing a telescopic function.

However, as described above, the steering column for a vehicle, according to the related art, has a structural problem in that a primary collision energy absorbing component, such as a capsule 121a coupled to the upper bracket 121, and a secondary collision energy absorbing component, such as a tearing plate (not illustrated), are separately required, and the number of components and working processes increase in order to separately manufacture and assemble the collision energy absorbing components.

Furthermore, a method of absorbing impact using the fracture of a tearing groove, which forms a groove having a predetermined depth, when the tearing plate secondarily absorbs a load after the capsule primarily absorbs a load has a problem in that manufacturing the product is complex, and deformation is vertically caused, which generates a lateral load deviation due to an interference with surrounding components.

SUMMARY OF THE INVENTION

The present invention has been conceived to solve such problems in the related art and is aimed at providing a steering column for a vehicle that can: easily adjust the collapse load of the steering column in case of a collision of the vehicle; improve collision performance by adjusting the collapse load in conformity with the collision property according to the type of vehicle; and reduce the number of components, the assembly process, and the assembly cost.

The aspect of the present invention is not limited thereto, and other unmentioned aspects of the present invention may be clearly appreciated by those skilled in the art from the following descriptions.

To this end, an exemplary embodiment of the present invention provides a steering column for a vehicle, including: an upper tube coupled to the exterior of a steering shaft and having a first long hole axially formed in one side surface thereof; a lower housing coupled to the outer circumferential surface of the upper tube and having a second long hole axially formed in one side surface thereof that corresponds to the first hole; a first support member supported on the inner circumferential surface of the upper tube; and a second support member, one side of which is coupled to a telescope drive unit and the opposite side of which is located on the outside of the lower housing and is coupled to the first support member through a fastening member passing through the first and second holes.

As described above, according to the present invention, it is possible to easily adjust the collapse load of the steering column in case of a collision of a vehicle, to improve collision performance by adjusting the collapse load in conformity with the collision property according to the type of vehicle, and to reduce the number of components, the assembly process, and the assembly cost.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the accompanying exemplary drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
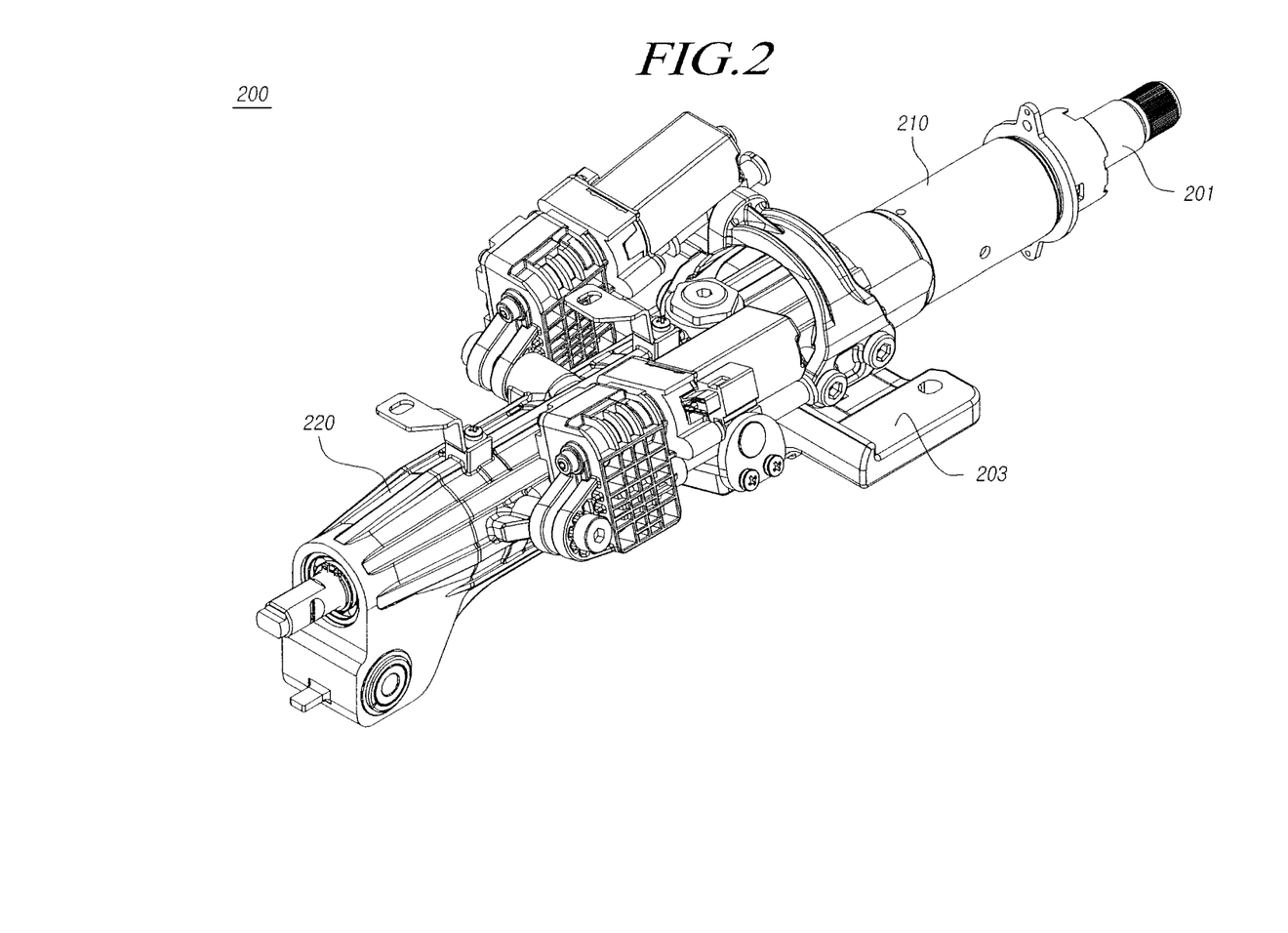
FIG. 2 is a perspective view of a steering column for a vehicle according to an embodiment of the present invention.
Figure 3:
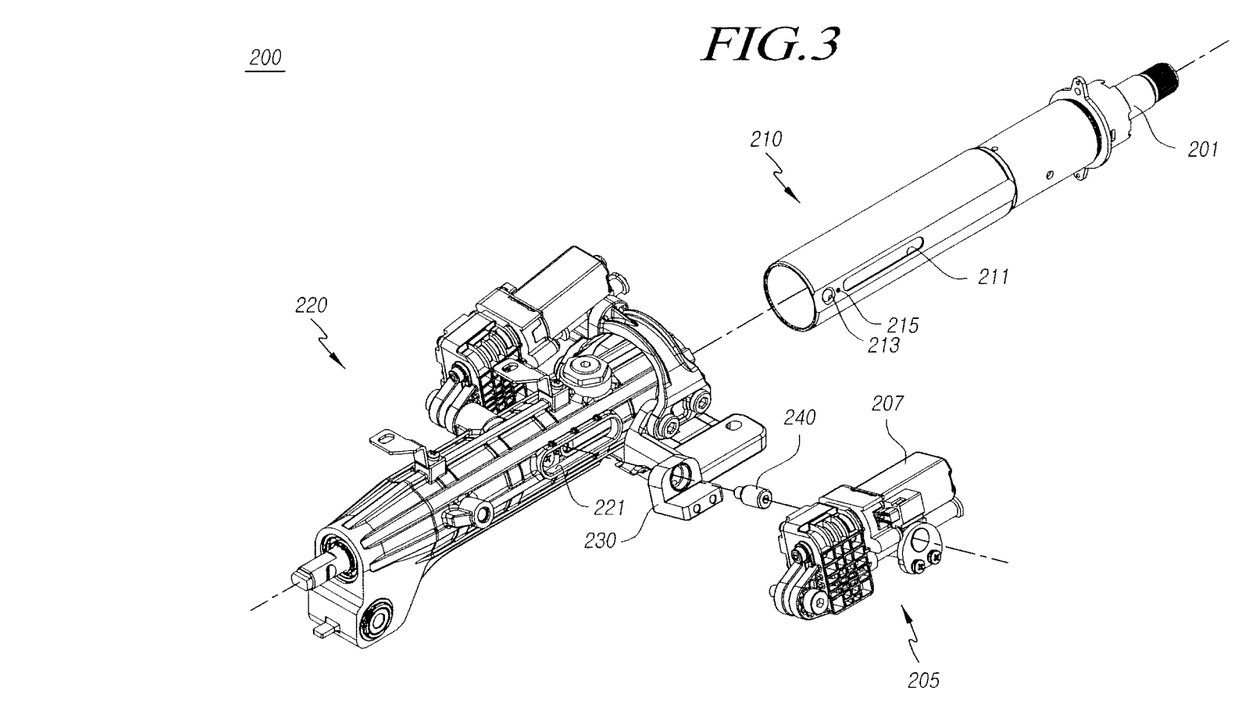
FIG. 3 is an exploded perspective view of the steering column illustrated in FIG. 2.
Figure 4:
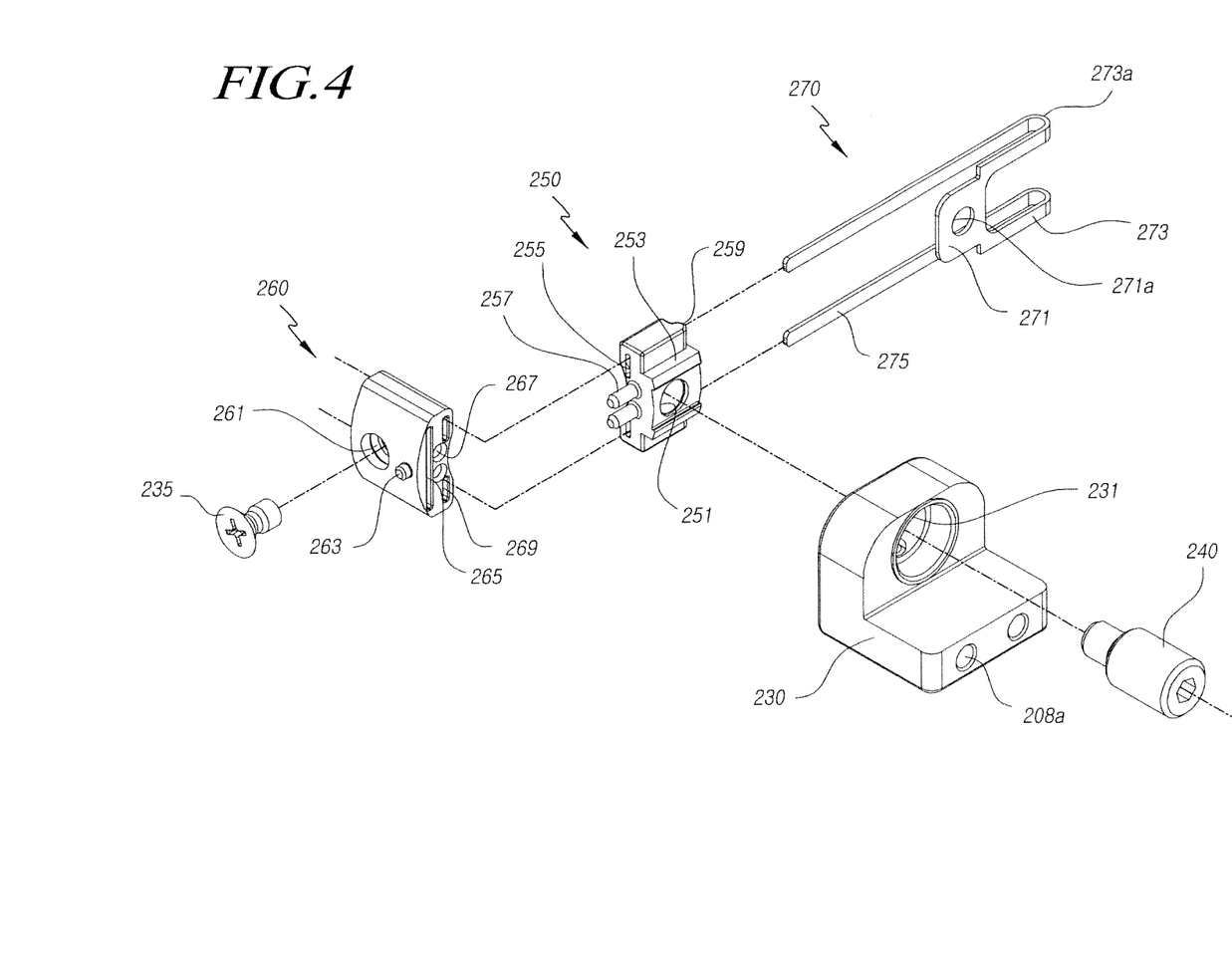
FIG. 4 is an exploded perspective view of a part of the steering column for a vehicle according to the embodiment of the present invention.
Figure 5:
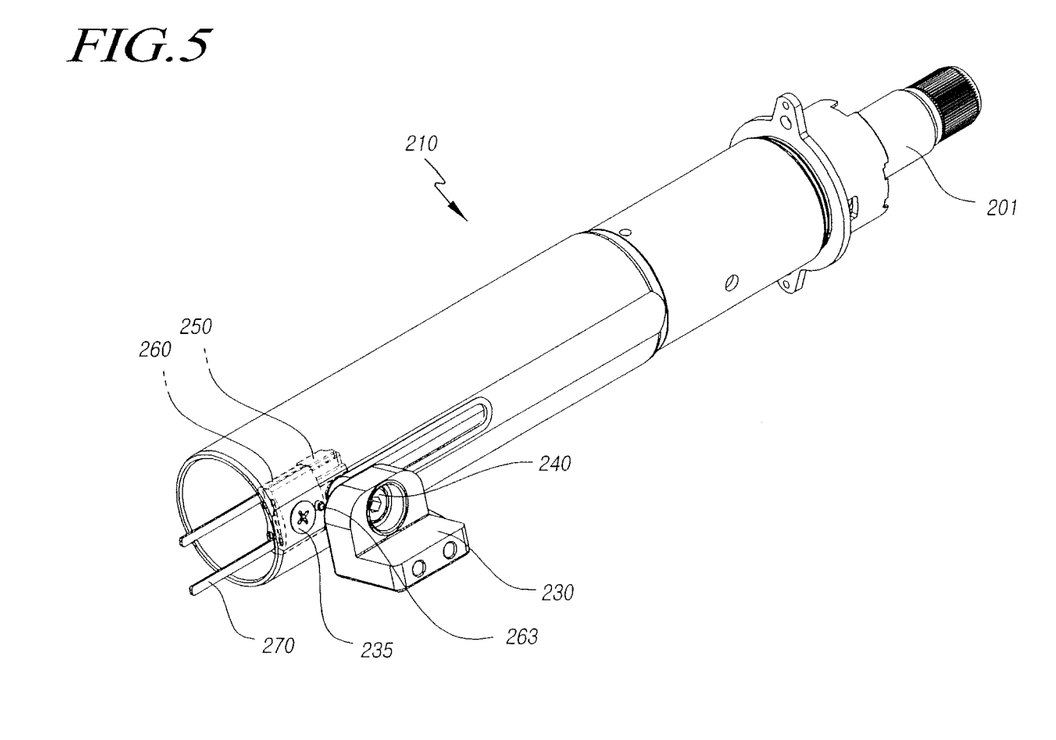
FIG. 5 is a perspective view of a part of the steering column for a vehicle according to the embodiment of the present invention.
Figure 6:
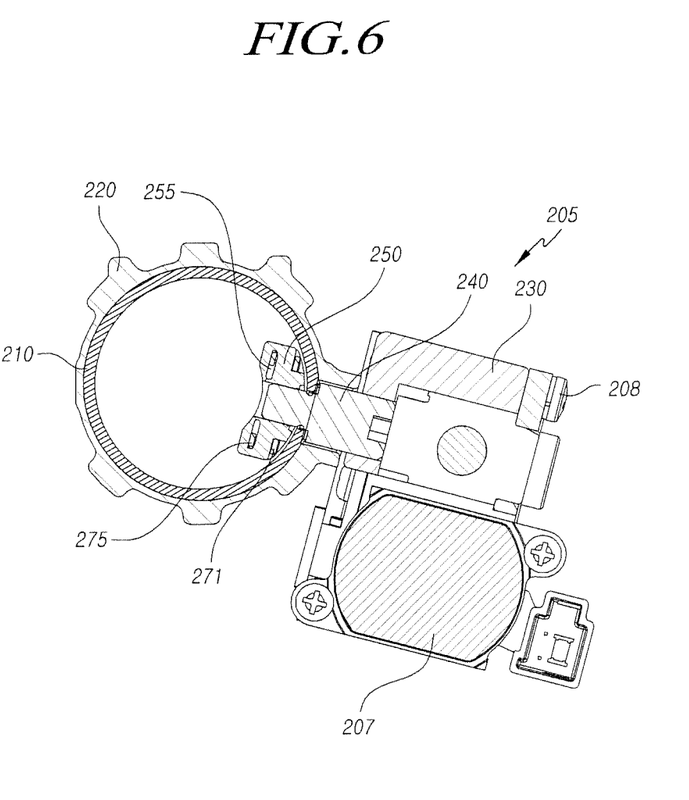
FIG. 6 is a sectional view of the steering column for a vehicle according to the embodiment of the present invention.

FIG. 2 is a perspective view of a steering column for a vehicle according to an embodiment of the present invention. FIG. 3 is an exploded perspective view of the steering column illustrated in FIG. 2. FIG. 4 is an exploded perspective view of a part of the steering column for a vehicle according to the embodiment of the present invention. FIG. 5 is a perspective view of a part of the steering column for a vehicle according to the embodiment of the present invention. FIG. 6 is a sectional view of the steering column for a vehicle according to the embodiment of the present invention.

As illustrated in the drawings, the steering column 200 for a vehicle, according to the embodiment of the present invention, includes: an upper tube 210 coupled to the exterior of a steering shaft 201 and having a first long hole 211 axially formed in one side surface thereof; a lower housing 220 coupled to the outer circumferential surface of the upper tube 210 and having a second long hole 221 axially formed in one side surface thereof that corresponds to the first hole 211; a first support member 250 supported on the inner circumferential surface of the upper tube 210; and a second support member 230, one side of which is coupled to a telescope drive unit 205 and the opposite side of which is located on the outside of the lower housing 220 and is coupled to the first support member 250 through a fastening member 240 passing through the first and second holes 211 and 221.

The steering column 200 for a vehicle, according to the embodiment of the present invention, is an electric steering column 200 in which the upper tube 210, which is inserted into and coupled to the lower housing 220, can perform a telescopic motion in the axial direction, and has a structure in which the upper tube 210 absorbs collision energy while collapsing toward the lower housing 220 in case of a collision of a vehicle.

The upper tube 210 is coupled to the exterior of the steering shaft 201, which transmits a steering force when a driver operates a steering wheel, while surrounding the steering shaft 201 and is inserted into the lower housing 220 in order to perform a collapse operation of sliding toward the lower housing 220 in case of a collision of the vehicle, and the lower housing 220, into which the upper tube 210 is inserted, is secured to the body of the vehicle by a mounting bracket 203.

The upper tube 210 is formed in a hollow shape and is inserted into the inner peripheral surface of the lower housing 220 to slide into the lower housing 220 in the axial direction during the collapse operation.

The upper tube 210 has the first long hole 211 axially formed in the side surface thereof so that the upper tube 210 can perform a collapse motion by the length of the first hole 211 in the axial direction, namely, in the collapse direction.

The lower housing 220 formed in a hollow shape has a collision energy absorbing structure in order to absorb collision energy while performing the collapse motion together with the upper tube 210 in case of a collision of the vehicle.

Namely, the lower housing 220 is coupled to the outer circumferential surface of the upper tube 210, which is inserted into the lower housing 220, while surrounding the upper tube 210, and the second long hole 221 is axially formed in one side surface of one end portion of the lower housing 220, into which the upper tube 210 is inserted, to correspond to the first hole 211 such that the first and second support members 250 and 230 are coupled to each other.

The second support member 230 coupled to the side surface of the lower housing 220 by the fastening member 240 passing through the second hole 221 is coupled to the telescope drive unit 205 operated by a motor 207 to usually move in the axial direction during the telescopic operation so that the upper tube 210 coupled to the first and second support members 250 and 230 can perform the telescopic motion.

The second support member 230 is firmly coupled to the telescope drive unit 205 by bolts 208 that pass through fastening holes 208a formed in a protruding end portion thereof.

Namely, during the telescopic operation, the fastening member 240 coupled through an adjustment hole 231 of the second support member 230 slides along the second hole 221 in the axial direction so that the upper tube 210 performs the telescopic motion, and when the telescopic operation stops, the first and second support members 250 and 230 are supported by the telescope drive unit 205, and hence are fixed without moving.

The first support member 250 supported on the inner circumferential surface of the upper tube 210 is coupled to the second support member 230, which is coupled to the outside of the lower housing 220, through the fastening member 240 so that collision energy is absorbed by a support force with which the first support member 250 presses against the upper tube 210 when the upper tube 210 collapses into the lower housing 220 in the axial direction in case of a collision of the vehicle.

The support force with which the first support member 250 presses against the upper tube 210 is adjusted according to the engagement length of the fastening member 240 that is screw-coupled to, or press-fit into, a through-hole 251 of the first support member 250, namely, according to the length by which the fastening member 240 is inserted into the through-hole 251.

Namely, when the engagement length of the fastening member 240 increases while the first support member 250 makes contact with the inner circumferential surface of the upper tube 210, the support force with which the first support member 250 presses against the upper tube 210 increases, in which case the collapse of the upper tube 210 into the lower housing 220 is determined according to which of the support force and the force by which the upper tube 210 collapses in the axial direction is greater.

Accordingly, the support force of the first support member 250 may be set in conformity with the collision property according to the type of vehicle.

Meanwhile, the steering column 200 may further include: a third support member 260 coupled to the upper tube 210 to collapse together with the upper tube 210 in the axial direction in case of a collision of the vehicle; and a bending member 270 that passes through the first and third support members 250 and 260 in the axial direction and has one end that is bent to surround the first support member 250 and is secured to the third support member 260.

The third support member 260 is coupled to the inside of an end portion of the upper tube 210 to collapse together with the upper tube 210 in the axial direction in case of a collision of the vehicle. When the third support member 260 draws the bending member 270, which is supported by the first support member 250, in the axial direction, the bent portion 273a of the bending member 270 is unbent by plastic deformation to absorb collision energy.

The bending member 270 broadly includes a fixing part 271, a first extension 273, and a second extension 275 such that the bent portion 273a is plastically deformed while being supported by the first support member 250 when the third support member 260 collapses together with the upper tube 210 while the bending member 270 is secured to the third support member 260.

The fixing part 271 of the bending member 270 is formed in the shape of a plate that is screw-coupled to, or press-fit into, the third support member 260 and the upper tube 210 and has a through-hole 271a formed therein.

Further, the bending member 270 includes the first extension 273 axially extending from ends of the fixing part 271 that are opposite to each other in the width M direction and the second extension 275 that is bent from the first extension 273 so as to be parallel to the fixing part 271.

The third support member 260 has an insertion groove 265 formed in a side surface thereof such that the fixing part 271 of the bending member 270 is inserted into the insertion groove 265 in the axial direction and a fastening hole 261 that communicates with the insertion groove 265 and the through-hole 271a of the fixing part 271, and is coupled to a coupling hole 213 of the upper tube 210 by a fastening member 235 passing through the fastening hole 261.

The first support member 250 has an insertion hole 255 formed through the side surfaces thereof, and the second extension 275 of the bending member 270 is axially inserted into, and supported by, the insertion hole 255. The third support member 260 has a support hole 269 that is formed through the side surfaces thereof and axially communicates with the insertion hole 255 of the first support member 250, and the second extension 275 of the bending member 270 is axially inserted into, and supported by, the support hole 269.

Accordingly, the bending member 270 can be plastically deformed while being supported by the first and third support members 250 and 260 without separation when the third support member 260 collapses together with the upper tube 210 in the axial direction.

In addition, the third support member 260 has a protrusion 263 that protrudes from the third support member 260 to the outside. The protrusion 263 is fixedly is inserted into a fixing hole 215 of the upper tube 210 in order to set the position where the third support member 260 is assembled.

The first support member 250 has a step portion 253 that protrudes from the first support member 250 toward the inner circumferential surface of the upper tube 210 and on which the first extension 273 is seated in order for the first extension 273 of the bending member 270 to be coupled while surrounding the first support member 250, whereby the bending member 270 can be firmly supported by the first support member 250 during the axial collapse.

The first support member 250 has a curved portion 259 on which the bent portion 273a of the bending member 270 is seated so that the bent portion 273a of the bending member 270 can smoothly slide without being stopped when the bent portion 273a is plastically deformed while being unbent, thereby achieving a small change in the amount of absorbed collision energy during the axial collapse.

Further, protrusions 257 are formed on one of the side surfaces of the first and third support members 250 and 260 that make contact with each other, and recesses 267 into which the protrusions 257 are inserted are formed in the other side surface so that the first and third support members 250 and 260 may be coupled to each other in the axial direction. In FIG. 4, an example in which the protrusions 257 are formed on the first support member 250 and the recesses 267 are formed in the third support member 260 is illustrated.

Accordingly, the first and third support members 250 and 260 to which the bending member 270 is coupled and assembled can be assembled to the upper tube 210 as a single assembly, thereby performing the assembly process in an easy and simple manner and preventing the components from being lost and not being assembled.

As described above, the first and third support members 250 and 260 are coupled to the upper tube 210 and the second support member 230 while the bending member 270 is coupled to the first and third support members 250 and 260 so that the first support member 250 collapses by the length of the first hole 211 while being supported by the inner circumferential surface of the upper tube 210 to absorb collision energy when the upper tube 210 collapses in case of a collision of the vehicle. At this time, the bending member 270 is plastically deformed to raise the collapse load, thereby absorbing more collision energy.

Further, if the thickness, or the material, of the bending member 270 is changed according to the collision property or load of a vehicle, collision performance can be improved in conformity with the collision property according to the type of vehicle without the development of separate components.

In addition, if the first extension 273 of the bending member 270 is formed to be long such that the bent portion 273a makes contact with the portion 259 of the first support member 250 after a collapse motion is carried out to a certain extent, the bending member 270 absorbs the collapse energy after the collapse motion that the first support member 250 is supported on the inner circumferential surface of the upper tube 210 is performed, thereby adjusting a collapse load in conformity with the collision property according to the type of vehicle.

According to the present invention having the above-mentioned structure and shape, it is possible to easily adjust the collapse load of the steering column in case of a collision of a vehicle, to improve collision performance by adjusting the collapse load in conformity with the collision property according to the type of vehicle, and to reduce the number of components, the assembly process, and the assembly cost.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | |
|---|---|
| 200: Steering column | 201: Steering shaft |
| 203: Mounting bracket | 210: Upper tube |
| 211: First hole | 213: Coupling hole |
| 215: Fixing hole | 220: Lower housing |
| 221: Second hole | 230: Second support member |
| 250: First support member | 260: Third support member |
| 270: Bending member | |

What is claimed is:

1. A steering column for a vehicle, comprising:
   an upper tube coupled to the exterior of a steering shaft and having a first long hole axially formed in one side surface thereof;
   a lower housing coupled to the outer circumferential surface of the upper tube and having a second long hole axially formed in one side surface thereof that corresponds to the first hole;
   a first support member supported on the inner circumferential surface of the upper tube; and
   a second support member, one side of which is coupled to a telescope drive unit and the opposite side of which is located on the outside of the lower housing and is coupled to the first support member through a fastening member passing through the first and second holes.

2. The steering column of claim 1, wherein the fastening member is screw-coupled to, or press-fit into, a through-hole of the first support member, and the support force with which the first support member presses against the upper tube is adjusted according to the engagement length of the fastening member in case of a collision of the vehicle.

3. The steering column of claim 2, further comprising:
   a third support member coupled to the upper tube to collapse together with the upper tube in the axial direction in case of the collision of the vehicle; and
   a bending member that passes through the first and third support members in the axial direction, wherein one end of the bending member is bent to surround the first support member and is secured to the third support member, and the bent portion is plastically deformed while being unbent during the collapse of the upper tube and the third support member.

4. The steering column of claim 3, wherein the bending member comprises a fixing part that is screw-coupled to, or press-fit into, the third support member and the upper tube and has a through-hole formed therein.

5. The steering column of claim 4, wherein the bending member further comprises: a first extension axially extending from ends of the fixing part that are opposite to each other in the width direction; and a second extension that is bent from the first extension so as to be parallel to the fixing part.

6. The steering column of claim 5, wherein the third support member has: an insertion groove formed therein into which the fixing part is inserted in the axial direction; and a fastening hole that communicates with the insertion groove and the through-hole of the fixing part.

7. The steering column of claim 5, wherein the first support member has an insertion hole formed therein, wherein the second extension is axially inserted into, and supported by, the insertion hole.

8. The steering column of claim 7, wherein the third support member has a support hole that communicates with the insertion hole in the axial direction, wherein the second extension is axially inserted into, and supported by, the support hole.

9. The steering column of claim 5, wherein the third support member has a protrusion that protrudes from the third support member to the outside and is fixedly inserted into a fixing hole of the upper tube.

10. The steering column of claim 5, wherein the first support member has a step portion that protrudes from the first support member toward the inner circumferential surface of the upper tube and on which the first extension is seated in order for the first extension to be coupled while surrounding the first support member.

11. The steering column of claim 5, wherein the first support member has a curved portion on which the bent portion of the bending member is seated.

12. The steering column of claim 5, wherein a protrusion is formed on one of the side surfaces of the first and third support members that make contact with each other, and a recess into which the protrusion is inserted is formed in the other of the side surfaces such that the first and third support members are coupled to each other in the axial direction.

* * * * *